(12) United States Patent
Sumino et al.

(10) Patent No.: US 7,590,741 B2
(45) Date of Patent: Sep. 15, 2009

(54) COMMUNICATION SYSTEM FOR ADDING DATA TRANSMISSION ORIGIN INFORMATION TO DATA

(75) Inventors: Hiromitsu Sumino, Yokosuka (JP); Hideharu Suzuki, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 701 days.

(21) Appl. No.: 10/483,980

(22) PCT Filed: Jul. 24, 2002

(86) PCT No.: PCT/JP02/07478

§ 371 (c)(1),
(2), (4) Date: Jan. 15, 2004

(87) PCT Pub. No.: WO03/010991

PCT Pub. Date: Feb. 6, 2003

(65) Prior Publication Data

US 2004/0185840 A1 Sep. 23, 2004

(30) Foreign Application Priority Data

Jul. 24, 2001 (JP) ............................ 2001-223425
Mar. 29, 2002 (JP) ............................ 2002-097319

(51) Int. Cl.
*G06F 15/16* (2006.01)
*H04W 40/00* (2009.01)
*H04K 1/00* (2006.01)

(52) U.S. Cl. ................... 709/227; 709/228; 455/445; 380/247; 380/270

(58) Field of Classification Search .............. 709/227, 709/228
See application file for complete search history.

(56) References Cited

U.S. PATENT DOCUMENTS 6,104,929 A * 8/2000 Josse et al. .................. 455/445
6,138,158 A * 10/2000 Boyle et al. ................. 709/225
2002/0012433 A1 * 1/2002 Haverinen et al. ........... 380/247
2002/0191795 A1 * 12/2002 Wills .......................... 380/270

FOREIGN PATENT DOCUMENTS

| JP | 10-133968 | 5/1998 |
| JP | 10-509006 A | 9/1998 |
| JP | 11-164018 | 6/1999 |
| JP | 2001-024798 | 1/2001 |
| JP | 2001-186125 | 7/2001 |
| JP | 2001-268075 | 9/2001 |
| JP | 2001-285916 | 10/2001 |
| JP | 2002-169734 | 6/2002 |
| WO | WO 96/34494 A1 | 10/1996 |
| WO | WO 98/34414 | 8/1998 |
| WO | WO 99/56431 A2 | 11/1999 |

OTHER PUBLICATIONS

Christian Bettstetter et al., GSM Phase 2+ General Packet Radio Service GPRS: Architecture, Protocols, and Air Interface, IEEE Communications Surveys, Third Quater 1999, vol. 2, No. 3.*

(Continued)

*Primary Examiner*—Nathan J Flynn
*Assistant Examiner*—Jeong S Park
(74) *Attorney, Agent, or Firm*—Brinks Hofer Gilson & Lione

(57) ABSTRACT

A Gateway 3 receives mobile station data corresponding to a mobile station 2 from a switching center in a mobile packet communication network 1. The mobile station data may be communicated with a communication protocol such as Network Management Protocol (NWMP). Mobile station 2 transmits and receives user data, such as Hypertext Transfer Protocol (HTTP) data, in a protocol, such as HTTP, via gateway 3. In transmitting user data from mobile station 2 to a server 5, gateway 3 may add the mobile station data corresponding to mobile station 2 to the data. Mobile station 2 cannot falsify the mobile station data because the added mobile station data corresponds to identification data used in establishing a wireless connection between mobile station 2 and mobile packet communication network 1. As a result, server 5 may trust mobile station data added by gateway 3 to the user data transmitted from mobile station 2.

58 Claims, 6 Drawing Sheets

OTHER PUBLICATIONS

Canadian Office Action dated May 3, 2006.

G. Brasche, B. Walke, "Analysis of Multi-Slot MAC Protocols proposed for the GSM Phase 2+ General Packet Radio Service," Mar. 1997, *1997 IEEE 47th Vehicular Technology Conference*, pp. 1295-1300.

Digital cellular telecommunications system (Phase 2+); General Packet Radio Service (GPRS); Service description; Stage 2 (GSM 03.60 proposed version 2.0.0) 1997, pp. 19, 32-35, 41-42, and 70; Table 5; and FIG. 12.

Digital cellular telecommunications system (Phase 2+); General Packet Radio Service (GPRS); Service description; Stage 2 (GSM 03.60 version 6.7.1 Release 1997), 110 pgs.

Digital cellular telecommunications system (Phase 2+); General Packet Radio Service (GPRS); Service description; Stage 2 (GSM 03.60 version 7.4.1 Release 1998), 117 pgs.

* cited by examiner

*FIG. 4*

| IP ADDRESS | TELEPHONE NUMBER | BASE STATION ID |
|---|---|---|
| aaa.bbb.ccc.ddd | 09011111111 | bs001 |
| bbb.ccc.ddd.eee | 09022222222 | bs002 |
| ccc.ddd.eee.fff | 09033333333 | bs003 |
| ddd.eee.fff.ggg | 09044444444 | bs004 |
| eee.fff.ggg.hhh | 09055555555 | bs005 |
| ⋮ | ⋮ | ⋮ |

COMMUNICATION SYSTEM FOR ADDING DATA TRANSMISSION ORIGIN INFORMATION TO DATA

TECHNICAL FIELD

The present invention relates to a communication system, data relay apparatus, data relay method, program, and storage medium which provide means for adding data source information relating to a mobile station, to transmitted data.

BACKGROUND ART

A mobile station may include data (hereinafter referred to as mobile station data) related to the mobile station, such as location information. The mobile station data may be added to data (hereinafter referred to as user data) transmitted from the mobile station to another communication apparatus. A communication apparatus that receives user data and mobile station data is able to respond based on the added mobile station data.

A mobile station may also perform text based data communication with other communication apparatus. The text based data communication conforms with a communication protocol using text data such as Hypertext Transfer Protocol (HTTP). Such a mobile station is more convenient to use, since it is able to easily establish data compatibility with a communication apparatus. In contrast, mobile stations that use binary data to perform data communication with other communication apparatus may have more difficulty establishing data compatibility.

SUMMARY

As mentioned above, a mobile station that adds mobile station data to user data is convenient to use since the mobile station is able to receive a response on the basis of the data of the mobile station. However, a mobile station capable of adding mobile station data may have mobile station data that has been falsified by a user of the mobile station. This possibility exists because mobile station data is added at the mobile station. Thus, a communication apparatus may receive user data to which unreliable mobile station data has been added. This is a significant problem in communication services that use data (hereinafter referred to as the identification data) for identifying a mobile station on the basis of mobile station data. Furthermore, if user data is in text format conforming to HTTP or the like, although such a format is more convenient to use, it is also easier for a user to falsify mobile station data than is the case with binary data. The problem of reliability of mobile station data will now be described using an example of a mail-order service.

First, a user of a mobile station starts a browser program that is provided in the mobile station, and uses HTTP to browse site information. The user then opens a site. The site may be a mail-order company in the communication network to which the mobile station belongs. Alternatively, the site may be a mail-order company in a communication network connected to the communication network to which the mobile station belongs. To make a purchase from the site, the user inputs an order number, a purchase amount, a delivery address, and a desired delivery time into an order form on the site. The user then performs an "execute" operation. As a result of the execute operation, the browser program creates user data. The user data consists of the information input by the user. Mobile station data in the form of the telephone number of the mobile station is added. The user data is in Hypertext Markup Language (HTML).

The browser program may transmit the user data to the server of the mail-order company as soon as the browser program creates user data to which the telephone number of the mobile station is added. The server of the mail-order company that receives the product order and the user data arranges for delivery of the ordered products. Simultaneously, the server of the mail-order company transmits a bill collection request to the server of a wireless carrier to charge for the product. The wireless carrier provides mobile communication services to the mobile station. The telephone number of the mobile station is added to the bill collection request.

When the server of the carrier receives the bill collection request, the amount charged in the bill collection request is added to the communication fee for the communication services provided to the mobile station. A total charge payable by the user of the mobile station is calculated. As a result, the purchased products are charged to the user of the mobile station along with the communication fee. This product charge is divided between the carrier and the mail-order company.

However, such a system is open to abuse. Namely, a user of a mobile station may order products from a mail-order service using false information. One way in which a user may abuse such a system is as follows: First, the user of the mobile station suspends operation of the browser program. The browser program may be suspended by means of modification of the browser program. The browser program may be suspended just before user data, which includes the telephone number of the mobile station, is transmitted to the server of the mail-order company.

While the browser is suspended, the user of the mobile station starts a text editor program and rewrites the telephone number of the mobile station to a different number. The user then resumes operation of the browser program. The browser program transmits the edited user data to the server of the mail-order company. The server of the mail-order company receives the edited user data and processes the bill collection of the product charge from the carrier. However, the product charge is debited incorrectly because the telephone number has been edited.

In a data communication system of the prior art, available services are restricted due to a lack of reliability of mobile station data. In contrast, the present invention provides a communication system, data relay apparatus, data relay method, program, and storage medium having data source means capable of adding information related to a mobile station to transmitted data. More specifically, the present invention provides a communication system that comprises a plurality of mobile stations served by a mobile communication network. In addition, the communication system comprises a communication apparatus served by the mobile communication network, or by other related communication networks, and a data relay apparatus that relays data between the mobile station and the communication apparatus.

The data relay apparatus comprises: storage means for storing a plurality of sets of mobile station data. Each set of mobile station data corresponds to a respective one of the mobile stations. In addition, the data relay apparatus comprises user data receiving means for receiving user data to be transmitted to the communication apparatus from one of the mobile stations. Extracting means for extracting a set of mobile station data corresponding to one of the mobile stations having its data stored by the storage means is also included in the data relay apparatus. The data relay apparatus also comprises adding means for adding all or a part of the mobile station data extracted by the extracting means, and transmitting means for transmitting user data to the communication apparatus. All or a part of the mobile station data is added by the adding means to the user data.

The present invention also provides a data relay apparatus that comprises receiving means for receiving user data to be transmitted to the communication apparatus served by the mobile network, or other related networks, from one of a plurality of mobile stations. In addition, the data relay apparatus includes extracting means, for extracting a set of data corresponding to the mobile station having its data stored by the storage means and adding means for adding all or a part of the mobile station data extracted by the extraction means. The data relay apparatus also comprises transmitting means for transmitting user data to the communication apparatus. All or a part of the mobile station data is added by the adding means to the user data.

In one embodiment, the data relay apparatus further comprises an identification data receiving means for receiving identification data. The identification data is used to identify a mobile station when it connects to the mobile network. The extraction means extracts a set of mobile station data corresponding to the connecting mobile station in accordance with the identification data.

In another embodiment, data processed by the data relay apparatus is a telephone number of a connecting mobile station. In another embodiment, the data relay apparatus comprises a receiving means for receiving identification data used to identify a mobile station when it connects to the communication apparatus. The extraction means extracts a set of mobile station data corresponding to the connecting mobile station in accordance with the identification data of the mobile station.

In another embodiment, the identification data which the data relay apparatus processes is an IP address allocated to the connecting mobile station. In another embodiment, the data relay apparatus further comprises a determining means for determining whether user data received by the receiving means is data to which a specific kind of data corresponding to the mobile station is added. A transmitting means transmits user data to which all or a part of a set of mobile station data is added by the adding means. The user data is transmitted only when the determining means determines that the user data received by the receiving means is not data to which the specific kind of data corresponding to the mobile station is added.

In another embodiment, the data relay apparatus further comprises a determining means for determining whether user data received by the receiving means is data to which a specific kind of data corresponding to the mobile station is added. A disconnecting means disconnects the communication connection that the transmitting means establishes with the communication apparatus to transmit user data. The communication connection is disconnected when the determining means determines that the user data received by the receiving means already has the specific kind of data corresponding to the mobile station added to the user data.

In another embodiment, the data relay apparatus comprises a determining means for determining whether user data received by the receiving means is data to which a specific kind of data corresponding to the mobile station is added. A deleting means in the data relay apparatus deletes the pre-added specific kind of data. The pre-added specific kind of data is deleted when the determining means determines that the user data received by the receiving means is data to which the specific kind of data corresponding to the mobile station is added. In another embodiment, the data apparatus further comprises a determining means for determining whether user data received by the user data receiving means satisfy a predetermined condition. When the determining means determines that the user data received by the user data receiving means does satisfy a predetermined condition, the adding means adds all or a part of the set of mobile station data.

In another embodiment, the set of mobile station data extracted by the extracting means includes data corresponding to at least one of a telephone number, an IP address, a model, location, a line speed, a delay of data transmission, and intensity in electric field of a radio wave of the mobile station. Alternatively, the extracting means may include data that is personal information of the user. The corresponding data is processed by the data relay apparatus.

In another embodiment, user data processed by the data relay apparatus is in a format conforming to HTTP. The adding means adds all or a part of a set of mobile station data to the user data as an extension header.

Additionally, the present invention provides a data relay system which comprises: a storage step for storing a plurality of sets of mobile station data. Each set of mobile station data corresponds to a respective one of a plurality of mobile stations. The data relay system also includes a user data receiving step for receiving user data to be transmitted to a communication apparatus served by the mobile communication network or by other related communication networks from a plurality of mobile stations. An extracting step for extracting a set of mobile station data corresponding to the mobile station from a plurality of sets of mobile station data is also included in the data relay system. The data relay system also includes an adding step for adding all or a part of mobile station data extracted by the extraction means to the user data. In addition, the data relay system includes a transmitting step for transmitting to the communication apparatus user data to which all or a part of mobile station data is added by the adding means.

The present invention also provides a computer program executable by a computer to store a plurality of sets of mobile station data. Each set of mobile station data corresponds to a respective one of a plurality of mobile stations served by the mobile communication network. The computer program is also executable by a computer to receive user data from mobile station. The user data may be transmitted to the communication apparatus served by the mobile communication network or by other related networks from connected mobile stations. In addition, the computer program is executable by a computer to extract a set of mobile station data corresponding to the mobile station data from the stored plurality of mobile station data. The extracted set of mobile station data corresponds to the received user data. The computer program is also executable by a computer to add all, or a part of, the extracted set of mobile station data to the communication apparatus, and to transmit user data to which all or a part of the mobile station data is added, to the communication apparatus. A storage medium is also provided for storing the computer program in a format readable by a computer.

These and other features and advantages of the invention will become apparent upon consideration of the following detailed description of the presently preferred embodiments, viewed in conjunction with the appended drawings. The foregoing discussion has been provided only by way of introduc-

BRIEF DESCRIPTION OF DRAWINGS

FIG. 4 is a conceptual diagram showing data in a mobile station database according to one embodiment of the present invention.

DETAILED DESCRIPTION OF THE PRESENTLY PREFERRED EMBODIMENTS (1) Structure of the Data Communication System FIG. 1 shows a portion of an overall configuration of an example communication system according to one embodiment of the present invention. Mobile packet communication network 1 provides a packet communication service to a mobile station 2. The mobile packet communication network 1 comprises a plurality of mobile stations 2, a plurality of base stations 11, and a plurality of switching centers 12. To simplify illustration of the mobile packet communication network 1, only one instance of each entity is shown in the figure.

Figure 1:
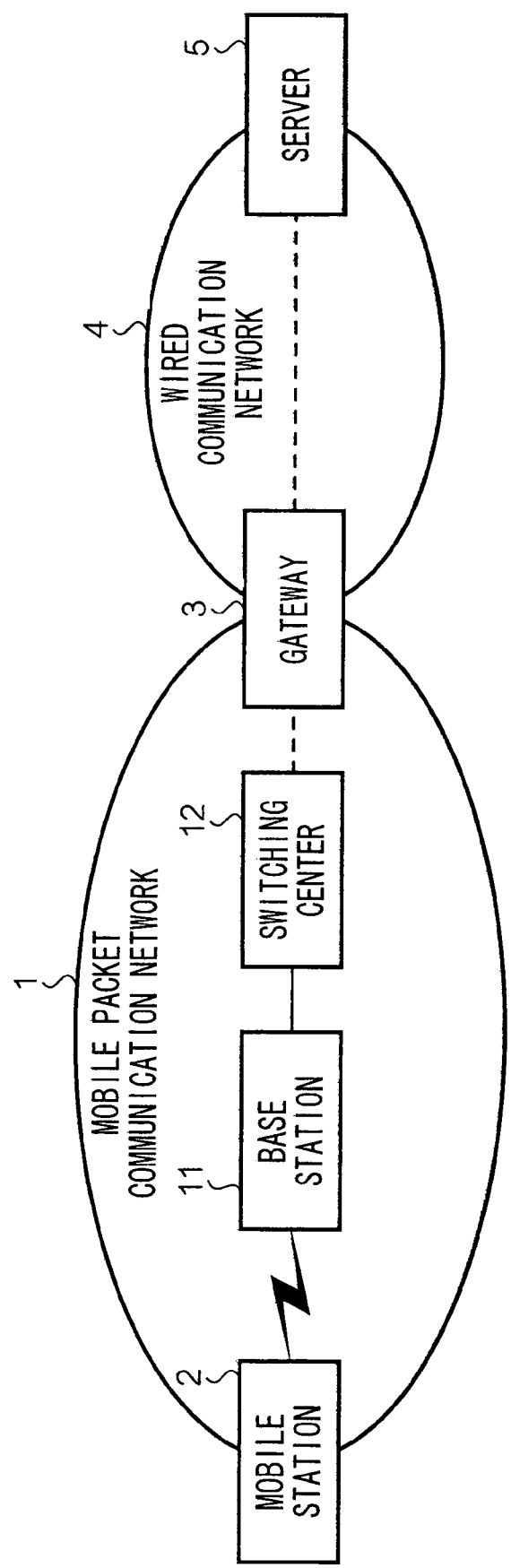
FIG. 1 shows an overall configuration of a communications system according to one embodiment of the present invention.

Mobile station 2 is a terminal device which a user of the mobile packet network 1 may use to transmit and receive data in packets. The data packets may be received from and transmitted to another communication apparatus (not shown). Mobile station 2 may establish a wireless communication connection with the base station 11 that has the strongest radio wave intensity. Mobile station 2 may perform packet communication with another communication apparatus via base station 11 using the established communication connection.

Base station 11 may output a carrier wave for communicating with mobile station 2. Base station 11 may form a wireless cell (or wireless communication area) that corresponds to a reachable range of the carrier wave. Base station 11 may establish a wireless communication connection with mobile station 2 that is present in a wireless cell served by base station 11. Base station 11 may have a wired connection with switching center 12, and maintain a constant connection with switching center 12. Base station 11 relays data transmitted and received between mobile station 2 and switching center 12. Data transmission and receipt may occur when mobile station 2 performs packet communication with another communication apparatus.

Switching center 12 is connected by wire to another switching center via a gateway mobile switching center (not shown in the Figures). When mobile station 2 performs packet communication with another mobile communication apparatus, switching center 12 relays data transmitted and received between mobile station 2 and the other mobile communication apparatus via base station 11. Data may be relayed after establishment of a communication path between mobile station 2 and the other mobile communication apparatus via the switching centers.

Gateway 3 is connected to both a gateway mobile switching center on the side of mobile packet communication network 1 and a gateway mobile switching center on the side of wired communication network 4. Gateway 3 may relay data transmitted and received between mobile packet network 1 and wired communication network 4. Data differing in format as a result of differences in protocols used to communicate within mobile packet communication network 1 and wired communication network 4 may be converted by gateway 3. Alternatively, a communication protocol that is common to both mobile packet communication network 1 and wired communication network 4, such as HTTP may be used.

Figure 2:
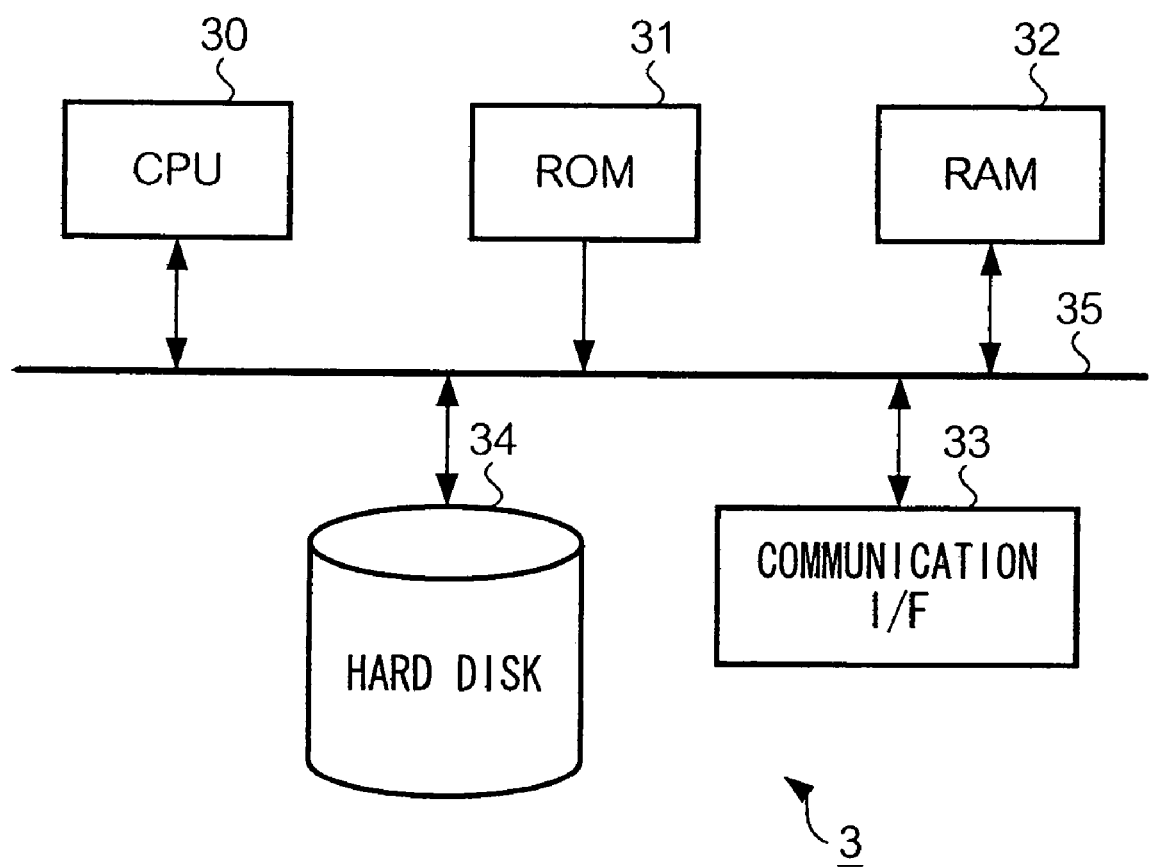
FIG. 2 is a block diagram illustrating a configuration of the gateway according to one embodiment of the present invention.

FIG. 2 is a block diagram illustrating an example configuration of gateway 3. Gateway 3 comprises Central Processing Unit (CPU) 30, Read Only Memory (ROM) 31, Random Access Memory (RAM) 32, communication interface (communication I/F) 33, hard disk 34, and system bus 35. The CPU 30 may be a microprocessor for controlling overall operation of gateway 3. The CPU 30 may read a control program from a nonvolatile memory such as ROM 31, and execute the instructions within the control program. ROM 31 may store the control program. A volatile memory such as RAM 32 may function as a work area for CPU 30. Communication I/F 33 may include first and second input/output ports. One of the first and second input/output ports may be connected to mobile packet communication network 1 (FIG. 1). The other of the first and second input/output ports may be connected, by wire, for example, to wired communication network 4 (FIG. 1).

Communication I/F 33 may receive data, such as digital data, via an electric signal from either of mobile packet communication network 1 and wired communication network 4. Received digital data may be transmitted to CPU 30. The CPU 30 may also transmit, via an electric signal, data, such as digital data, to each of mobile packet communication network 1 or wired communication network 4. Hard disk 34 may be a large capacity nonvolatile storage device. Hard disk 34 may store a database and a program. The database may record mobile station data for each mobile station 2. The program stored in hard disk 34 may enable CPU 30 to execute instructions to add mobile station data to user data transmitted from mobile station 2 to server 5 as will be described later. System bus 35 may be any form of signal transmission path for signals that are transmitted, such as when gateway 3 transmits and receives data.

Referring again to FIG. 1, wired communication network 4 may be a wide area network connected to any of a plurality of other networks. Wired communication network 4 comprises gateway 3, server 5, and any number of other communication apparatus not shown in the figures. In wired communication network 4, each communication apparatus may communicate with server 5 utilizing either a dedicated line or encryption to prevent unauthorized access to the data. Server 5 functions as a gateway to provide and collect information by transmitting and receiving data such as text data. The data may be transmitted to and from other communication apparatus in the other networks to the mobile station 2 via wired communication network 4 and mobile packet communication network 1.

(2) Outline of Transmitted Data

Figure 3:
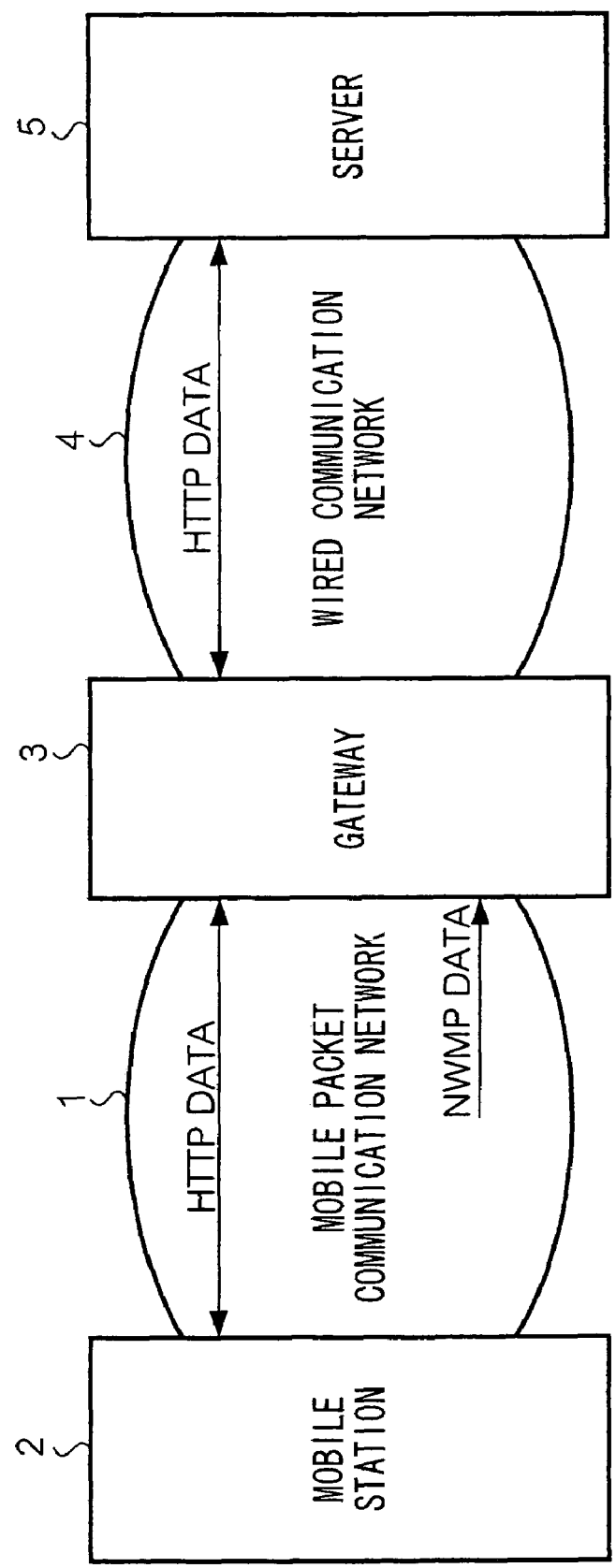
FIG. 3 is a conceptual diagram showing a data format transmitted and received between a mobile station, a gateway, and a server according to one embodiment of the present invention.

FIG. 3 is a conceptual illustration of an example data format transmitted and received among mobile station 2, gateway 3, and server 5. A variety of data (hereinafter referred to as Network Management Protocol (NWMP) data) for administering each mobile station 2 may be communicated between switching center 12 (FIG. 1) and gateway 3 within the mobile packet communication network 1. The NWMP data may be transmitted and received in packet form using a communication protocol, such as User Datagram Protocol (UDP). Communication of the NWMP data may conform to a communication protocol of an upper layer referred to as a Network Management Protocol (NWMP) layer.

Data, such as HTTP data, may be communicated between mobile station 2 and gateway 3 and between gateway 3 and server 5 using a communication protocol such as Transmission Control Protocol (TCP). For example, when a wireless communication connection is being established between mobile station 2 and base station 11, base station 11 may transmit a telephone number of the mobile station 2 to the switching center 12. The telephone number may be used as an identification number of mobile station 2 in establishing a wireless communication connection. When switching center 12 receives the telephone number of mobile station 2 from base station 11, switching center 12 may allocate a unique address, such as an IP address. A plurality of switching centers 12 may cooperate with each other to administer a unique address, such as an IP address. The IP address may be allocated to a communication apparatus such as a switching center in mobile packet communication network 1. The switching centers 12 may also cooperatively administer an IP address that is allocated to each mobile station. Apart from these allocated IP addresses, no other IP addresses may be used in the mobile packet communication network 1.

Switching center 12 may also compile and administer various kinds of information related to each mobile station 2 in the geographic area defined by the wireless cell of a base station. The information may include operational parameters such as line speed or an amount of transmitted data. The information may be compiled and administered based on an identification number (hereinafter referred as an ID) of base station 11 and the telephone number of the mobile station 2.

As previously discussed, the telephone number of mobile station 2 is administered by switching center 12 and may function as identification data when mobile station 2 connects to mobile packet communication network 1. Accordingly, it is not possible for a user of mobile station 2 to falsify the telephone number following connection to the mobile packet communication network 1. In addition, the IP address allocated to mobile station 2 is an IP address that is allocated to the telephone number. Thus, mobile station 2 is not able to use any other IP address. For example, the user of mobile station 2 cannot transmit user data, such as HTTP data, separate from the IP address allocated to the telephone number. Furthermore, since information such as a line speed and/or an amount of transmitted data of each mobile station is compiled at switching center 12, use of the NWMP layer does not originate at mobile station 2. Therefore, a user of mobile station 2 may not falsify NWMP data.

Mobile station 2 may communicate with server 5 after connecting to mobile packet communication network 1 using a communication connection (hereinafter referred to as TCP connection). The TCP connection may be established using a protocol such as TCP between mobile station 2 and gateway 3. A TCP connection may also be established between gateway 3 and server 5. Gateway 3 may relay data over a communication route established by the TCP connections between mobile station 2 and gateway 3 and between server 5 and gateway 3. Using this communication route, data, such as HTTP data, can be transmitted and received by mobile station 2 with server 5.

Gateway 3 may transmit to switching server 12 a request for mobile station data corresponding to mobile station 2. The request may be transmitted using NWMP. The request may be initiated when gateway 3 relays data over the TCP connections established between mobile station 2 and server 5. Simultaneously, gateway 3 may transmit the IP address of mobile station 2, to switching center 12. The IP address of mobile station 2 may be obtained during establishment of a connection between mobile station 2 and mobile packet communication network 1.

Switching center 12 may receive the IP address of mobile station 2 within the mobile station data of mobile station 2. Switching center 12 may then read data corresponding to the IP address received from NWMP data of each administered mobile station 2. The data read by the switching center 12 and the IP address may be transmitted as mobile station data to gateway 3 using NWMP. Gateway 3 may store mobile station data, obtained as described above, in a mobile station database in hard disk 34 (FIG. 2).

FIG. 4 shows examples of data stored in a mobile station database. For simplicity, only an IP address and telephone number of each mobile station 2, and an ID of base station 11 with which each mobile station 2 establishes a connection, is shown. Data in the mobile station database administered by the gateway 3 may be obtained from switching center 12. The highly reliable data from the switching center 12 is maintained in the mobile station database of gateway 3.

(3) Storage and Addition of Mobile Station Data

During operation, gateway 3 may receive mobile station data from switching center 12, and add the mobile station data to the user data when the user data is transmitted from mobile station 2 to server 5.

Figure 5:
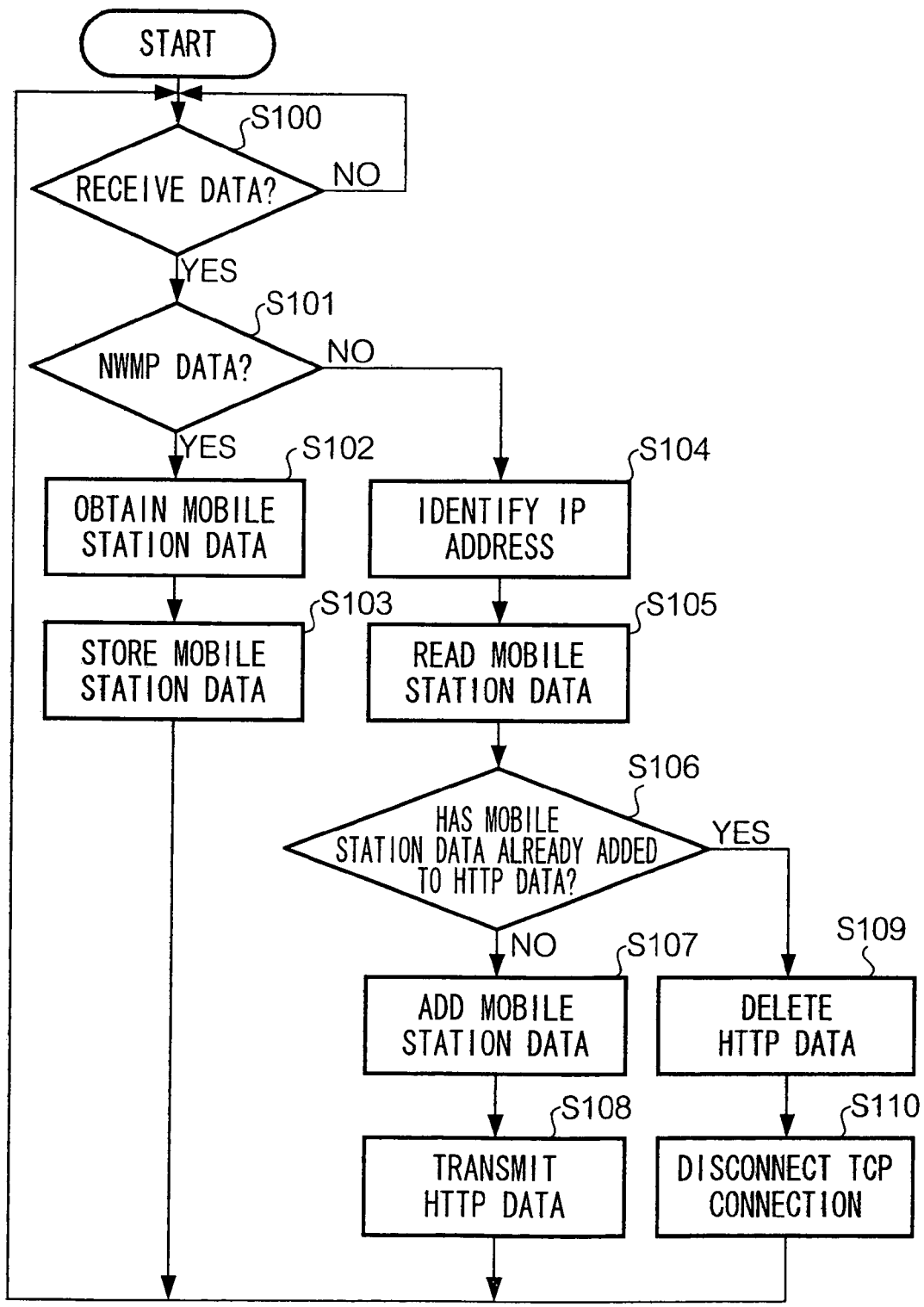
FIG. 5 is a flowchart illustrating processing of mobile station data according to one embodiment of the present invention.

FIG. 5 is a flowchart illustrating example operation of the gateway 3 of FIG. 2 with reference to FIGS. 1 and 3. The operation is executed by CPU 30 in accordance with an adding program stored on the hard disk 34. CPU 30 determines if data has been received from mobile station 2 via communication I/F 33 at step S100. The received data is either NWMP data transmitted from switching center 12 in response to a request from gateway 3, or user data, such as HTTP data transmitted from mobile station 2 to server 5. At step 101, CPU 30 determines whether the received data is NWMP data. If the received data is determined to be NWMP data, CPU 30 obtains mobile station data, namely an IP address and telephone number of mobile station 2, and an ID of base station 11 connected to mobile station 2 at step S102. The CPU 30 stores the obtained mobile station data in mobile station database at step S103.

On the other hand, in step S101, if the received data is determined not to be NWMP data but is instead HTTP data, CPU 30 obtains an IP address from the received HTTP data at step S104. At step S105, CPU 30 reads mobile station data related to the IP address that is stored in the mobile station database. The CPU 30 determines whether mobile station data has already been added as an expansion header to the HTTP data at step S106. If the mobile station data has not been added to the HTTP data as an expansion header, CPU 30 adds the mobile station data, read from database, to the HTTP data as an expansion header at step S107. At step S108, CPU 30 transmits the HTTP data that includes the added mobile station data, to server 5.

Figure 6:
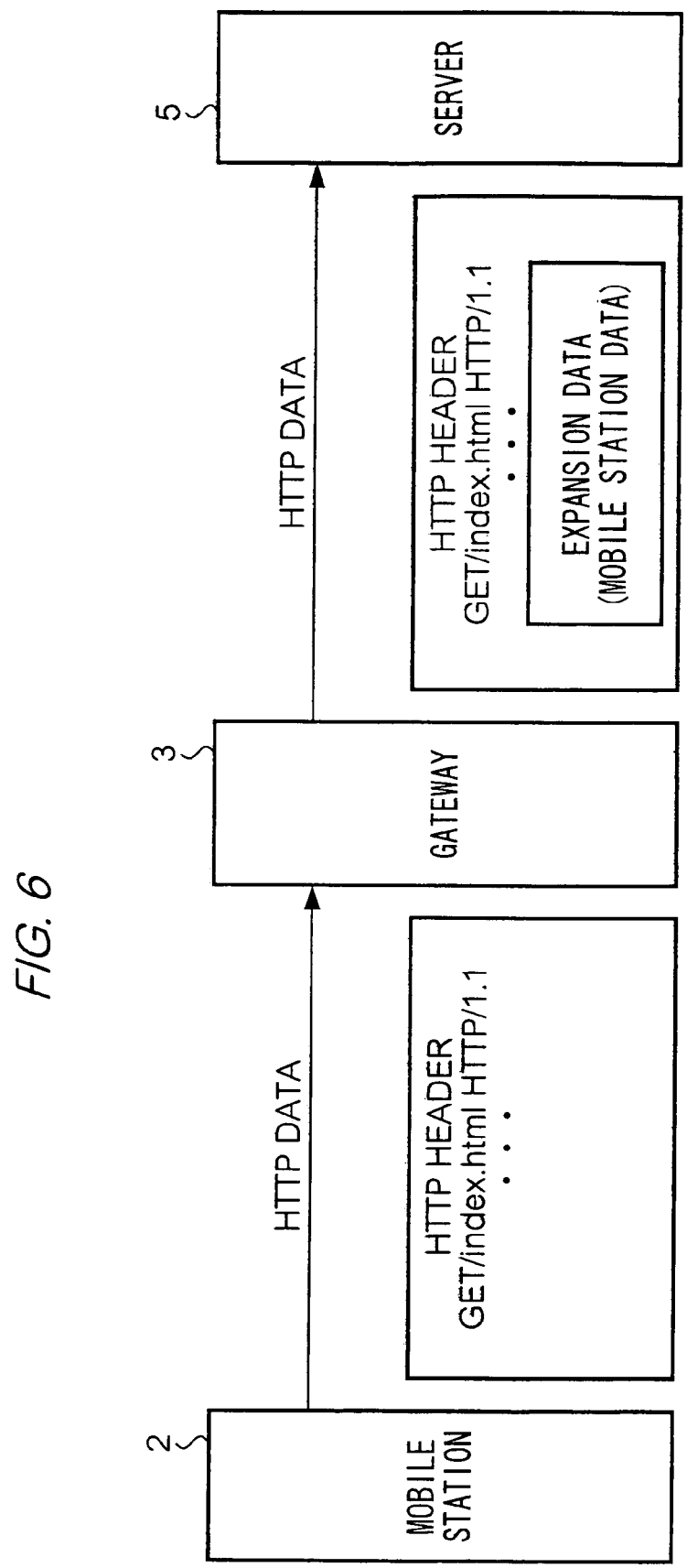
FIG. 6 is a diagram illustrating addition of mobile station data to data transmitted and received among a mobile station, a gateway, and a server.

FIG. 6 illustrates conceptually an example of the addition of the mobile station data to user data that is HTTP data transmitted from mobile station 2 to server 5. As shown in FIG. 6, the mobile station data is added at gateway 3 as an expansion header in accordance with HTTP. Accordingly, no protocol modification for communication of the HTTP data in wired communication network 4 is necessary. If server 5 that receives the HTTP data does not require mobile station data, the added expansion header is ignored. Thus, no operational modifications of server 5 are necessary.

Referring again to FIG. 5, if mobile station data is determined to have already been added as an expansion header to the HTTP data at step S106, CPU 30 deletes the HTTP data at step S109. The CPU 30 deletes the mobile station data since the mobile station data is supposed to be added at gateway 3 to ensure integrity of the mobile station data. Thus, mobile station data that may have been added falsely at mobile station 2 or at some midpoint in the data communication path between mobile station 2 and gateway 3 is deleted. At step S110, CPU 30 disconnects the TCP connection with mobile station 2. The TCP connection established between mobile station 2 and gateway 3 is deemed to be insecure due to the added mobile station data and is therefore terminated.

By the operation described above, it is not possible for unreliable user data to be transmitted to server 5. Thus, only highly reliable mobile station data is transmitted to server 5.

(4) Effect of the Embodiment

Referring again to FIG. 1, as previously described, a telephone number of mobile station 2 may function as identification data when connecting the mobile station 2 to the mobile packet communication network 1. An IP address of the mobile station 2 is used in conjunction with this identification data for transmission to gateway 3. Accordingly, when mobile station 2 transmits user data such as HTTP data to server 5, mobile station data corresponding to the identification data of mobile station 2 is added to the HTTP data at gateway 3. As a consequence, the mobile station data of mobile station 2 that is added to the HTTP data received at server 5 is secure.

In contrast, if the mobile station data, which should be added at gateway 3, was added to the HTTP data before the HTTP data arrived at gateway 3, gateway 3 deletes the HTTP data as unreliable data. In addition, gateway 3 disconnects the TCP connection with mobile station 2. It is therefore unlikely that any HTTP data that includes unreliable mobile station data is transmitted to server 5. Instead, mobile station data of mobile station 2 that is added to HTTP data received by server 5 is reliable. Furthermore, since the mobile station data of mobile station 2 is added to the HTTP data as an expansion header of HTTP, it is not necessary to modify a protocol used in either mobile packet communication network 1 or wired communication network 4. Thus, a conventional data communication system may be used with few modifications to implement the embodiment of the present invention.

B: Modifications

It is to be understood that the data system of the present invention is not restricted to the embodiments described above, and a variety of modifications that are within the technical scope of the present invention will be apparent to those skilled in the art. For example:

Modification 1

In this modification, unlike the above-described embodiments, gateway 3 adds to the user data only the mobile station data stored in the mobile station database that is necessary. For example, in a service in which server 5 requires only a telephone number of mobile station 2, gateway 3 adds only the telephone number data of mobile station 2 to the user data transmitted from mobile station 2 to server 5. Thus, an IP address of mobile station 2, a base station ID, or any other data is not added to the user data. Similarly, in a service in which server 5 requires only a line speed of mobile station 2, gateway 3 adds only line speed data related to mobile station 2 to the user data. Mobile station 2 may add a request for the addition of mobile station data. The request may indicate the amount of mobile station data needed to be transmitted to server 5. Therefore, unnecessary transmission to server 5 of, for example, a telephone number is prevented, and information security in the data communication system is enhanced.

Modification 2

In this embodiment, gateway 3 adds to the user data transmitted from mobile station 2 to server 5 only mobile station data that is requested to be added by-mobile station 2. For example, if the user data concerns only a general information matter, it is not necessary to identify the source of the data. Thus, the addition of the mobile station data is not required. Moreover, if the mobile station data includes personal information, it is preferable not to transmit such data to server 5. Thus, only necessary mobile station data is requested by mobile station 2 to be added to the user data. Specifically, mobile station 2 may add an expansion header to transmitted user data that is HTTP data when it is necessary for mobile station 2 to transmit the HTTP data to server 5 with added mobile station data. The expansion header may indicate a request for addition of mobile station data. Thus, CPU 30 (FIG. 2) in gateway 3 adds mobile station data to the user data only when a request for the addition of mobile station data is added.

Modification 3

In this embodiment, gateway 3 adds mobile station data to user data only when a predetermined condition is satisfied. For example, a condition for addition of mobile station data may be "the first transmitted user data after establishing a communication route." For this condition, mobile station data of mobile station 2 is added to only the first data transmitted from mobile station 2 to server 5 after a communication route is established by gateway 3 between mobile station 2 and server 5. Thus, mobile station data is not added to 5 user data that is subsequently transmitted via the same communication route.

In another example, the condition for addition of mobile station data is "when mobile station data is changed." Mobile station data is therefore added to user data transmitted from mobile station 2 to the server 5 only when the mobile station data is changed in the mobile station database at gateway 3. Likewise, conditions for addition of mobile station data to the user data may be varied based on operational parameters. For example, "when the power of the radio wave decreases below predetermined level"; "when the service area in which the mobile station exists is changed"; and/or "periodically with a certain time interval". Such a condition is provided as a parameter in the operation program.

Modification 4

In this embodiment, gateway 3 stores a variety of kinds of administration data processed as NWMP data. In addition, mobile station data such as a telephone number of mobile station 2, an ID of base station 11 connecting to mobile station 2, line speed, and communication data volume at mobile station 2 may be stored by gateway 3. Gateway 3 can add such mobile station data as administration data to the user data. Other data that can be added to the user data includes propagation delay in data transmitted by mobile station 2, electric field intensity data of the radio wave emitted by mobile station 2, and so on. In actuality, data content of the mobile station data can be freely changed.

Modification 5

In this embodiment, when gateway 3 adds mobile station data of mobile station 2 to the user data transmitted from mobile station 2 to the server 5, the identification data does not include an IP address of mobile station 2. Alternatively, user data of a mobile station 2 and mobile station data in a mobile station database can be matched by using an address, such as a Media Access Control (MAC) address allocated to mobile station 2.

Modification 6

In this embodiment, if mobile station data has already been added to user data transmitted from mobile station 2 to the server 5, gateway 3 does not delete the user data. Instead, gateway 3 reads the correct mobile station data from the mobile station database, and replaces any pre-added mobile station data with the mobile station data read from the mobile station database. In addition, if mobile station data has already been added to the user data transmitted from mobile station 2, and it is not necessary to retransmit the mobile station data to server 5, gateway 3 deletes the mobile station data from the user data. Gateway 3 then transmits the user data without the mobile station data to server 5. It is to be noted in this case that a TCP connection between mobile station 2 and gateway 3 is maintained.

Modification 7

In this embodiment, any protocol other than NWMP can be used for transmitting and receiving administration data of a communication network in a mobile packet communication network. Further, any kind of protocol other than HTTP can be used for transmitting and receiving user data in mobile packet communication network 1 and wired communication network 4. Further, gateway 3 can add mobile station data that includes data related to the geographic location of mobile station 2 when data is transmitted and received. The geographic location data may be added in response to a data format that conforms with the protocol used.

Modification 8

In this embodiment, a sector ID of an area in which mobile station 2 resides is recorded as geographic location data for mobile station 2. The sector ID is a unit corresponding to a reachable range of a carrier wave transmitted from base station 11 divided by a directivity of the carrier wave. The sector ID allows a geographic location of a mobile station 2 in the range of base station 11 to be measured with precision. In the data system of this embodiment, by adding the sector ID to the user data, gateway 3 can provide an information service on the basis of the user's present or modified geographic position.

Modification 9

In this embodiment, mobile station 2 utilizes a Global Positioning System (GPS). In addition, mobile packet communication network 1 comprises a GPS server (not shown) that functions to receive geographic location data of mobile station 2 and record the geographic location data. The GPS server transmits the geographic location data of mobile station 2 periodically. By using such geographic location data, it is possible to more precisely measure a geographic location of mobile station 2, as opposed to using a sector ID as described in the embodiment above.

When gateway 3 receives geographic location data of mobile station 2 from the GPS server, gateway 3 records the received geographic location data in the mobile station database. In addition, gateway 3 adds the received geographic location data to the user data transmitted from mobile station 2 to server 5.

Modification 10

In this embodiment, at gateway 3 a variety of storage devices may be used, such as a CD-ROM drive, a Magneto Optical (MO) drive, and so on. CPU 30 reads a program stored in one such storage medium to perform a variety of operations, such as addition of mobile station data to user data.

Modification 11

In this embodiment, mobile packet communication network 1 comprises a database server that functions to administer data within a database such as personal information of a user, usage history of mobile station 2, and the like. A network operator obtains data of a mobile station 2 from the database server. Such information may include personal information. The personal information may be submitted by a user of mobile station 2 in subscribing to the service and/or may be information obtained by questionnaire, as opposed to administration data administered by a switching center. Gateway 3 obtains such data from the database as required, and adds the obtained data to user data transmitted from mobile station 2 to server 5. The obtained data may be added similar to adding mobile station data obtained from switching server 12 to the user data as previously discussed. Thus, data types administered by the database server can be freely changed. The data communication system of this embodiment is able to provide a greater variety of services. For example, marketing services may be provided by utilizing statistical data about sites accessed by mobile station 2.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

The invention claimed is:

1. A communication system for maintaining the identity of a mobile station in communications transmitted from the mobile station over a wireless network, the communication system comprising:

a mobile packet communication network configured to provide a wireless connection with the mobile station as a function of mobile station data, wherein the mobile station data comprises identification data provided by the mobile station during formation of the wireless connection;

a gateway coupled with the mobile packet communication network, the gateway configured to store the mobile station data;

a wired communication network coupled with the gateway, wherein the gateway is configured to determine whether user data received from the mobile station after formation of the wireless connection already includes a first portion of the identification data provided by the mobile station during formation of the wireless connection; and in response to determination that the user data received from the mobile station after formation of the wireless connection fails to already include the first portion of the identification data provided by the mobile station during formation of the wireless connection, the gateway is further configured to add at least a second portion of the identification data to the user data received from the mobile station, wherein the gateway is further configured to relay the user data with the second portion of the identification data from the mobile packet communication network to the wired communication network.

2. The communication system of claim 1, wherein the identification data comprises a telephone number of the mobile station, and the mobile station data further comprises a unique address assigned to the mobile station during formation of the wireless connection.

3. The communication system of claim 2, wherein the unique address is an internet protocol address.

4. The communication system of claim 2, wherein the mobile station data further comprises data related to a base station identification.

5. The communication system of claim 2, wherein the mobile station data further comprises data corresponding to a geographic location of the mobile station.

6. The communication system of claim 1, further comprising a mobile station database accessible by the gateway, the gateway configured to store a plurality of sets of mobile station data in the mobile station database, wherein each of the sets of mobile station data corresponds to each of a plurality of mobile stations.

7. The communication system of claim 6, wherein addition, by the gateway, of the at least the second portion of the identification data to the user data received from the mobile station comprises:
wherein the gateway is configured to extract the at least the second portion of the identification data from one of the stored sets of mobile station data stored in the mobile station databases; and
wherein the gateway is further configured to add the extracted at least the second portion of the identification data to the user data as a function of a unique address included in the mobile station database and the user data.

8. The communication system of claim 1, wherein the gateway is further configured to add an expansion header to the user data received by the gateway from the mobile station, after establishment of the wireless connection between the mobile station and the gateway, and wherein the expansion header contains the second portion of the identification data added to the user data.

9. The communication system of claim 1, wherein the gateway is further configured to terminate the wireless connection to the mobile station in response to determination that the user data received from the mobile station after formation of the wireless connection already includes the first portion of the identification data provided by the mobile station during formation of the wireless connection.

10. The communication system of claim 1, wherein the first portion of the identification data and the second portion of the identification data are different.

11. A communication system for maintaining an identity of a mobile station in communications transmitted from the mobile station over a wireless network, the communication system comprising:
a base station configured to establish a wireless connection with the mobile station as a function of identification data received from the mobile station to establish the wireless connection;
a switching center configured to receive the identification data from the base station and assign a unique address to the mobile station;
a gateway configured to receive the identification data and the associated unique address from the switching center; and
the gateway further configured to provide a portion of a communication route between the mobile station and a communication apparatus after establishment of the wireless connection, the gateway further configured to determine whether user data transmitted by the mobile station over the portion of the communication route to the communication apparatus already includes at least some portion of the identification data; and
in response to determination that the user data received from the mobile station fails to already include at least some portion of the identification data, the gateway further configured to add at least a portion of the identification data to the user data.

12. The communication system of claim 11, wherein the switching center is configured to communicate the identification data and the unique address to the gateway with a network management protocol.

13. The communication system of claim 11, wherein the user data comprises hypertext transfer protocol data; and
wherein the gateway is further configured to add the at least a portion of the identification data to the hypertext transfer protocol data as an expansion header before the user data is relayed by the gateway towards the communications apparatus.

14. The communication system of claim 11, wherein the identification data comprises a telephone number and the unique address comprises an internet protocol address.

15. The communication system of claim 11, wherein the user data comprises the unique address and is communicated over the portion of the communication route with a communication protocol that comprises a transmission control protocol.

16. The communication system of claim 11, wherein the identification data and the associated unique address for each of a plurality of mobile stations is stored in a mobile station database that is accessible with the gateway, and the identification data for each of the mobile stations is to be extracted from the mobile station database as a function of the unique address being included in the user data.

17. The communication system of claim 11, wherein the gateway is configured to stop further transmission of user data transmitted by the mobile station that already includes the at least some portion of the identification data.

18. The communication system of claim 11, wherein the gateway is configured to terminate the wireless connection if the user data transmitted by the mobile station includes the at least some portion of the identification data that is unrecognized by the gateway.

19. The communication system of claim 11, further comprising a server coupled with the gateway by a wired communication network that forms another portion of the communication route, wherein the server is configured to relay the user data toward the communication apparatus.

20. The communication system of claim 11, wherein the user data is transmitted from the mobile station after the mobile station establishes the wireless connection with the base station.

21. The communication system of claim 11, wherein the gateway is configured to terminate the wireless connection in response to determination that the user data, received from the mobile station after establishment of the wireless connection, includes the first portion of the identification data received from the mobile station to establish the wireless connection.

22. The communication system of claim 11, where in response to determination that the user data received from the mobile station already includes the at least some portion of the identification data, the gateway is further configured to terminate the wireless connection.

23. The communication system of claim 11, wherein the at least some portion of the identification data and the at least the portion of the identification data added to the user data are different.

24. A communication system for maintaining an identity of a mobile station in communications transmitted from the mobile station over a wireless network, the communication system comprising:
- a storage medium;
- computer program code stored in the storage medium, the computer program code executable on a processor to store mobile station data, wherein the mobile station data comprises identification data of the mobile station that is provided by the mobile station during establishment of a connection to the wireless network;
- computer program code stored in the storage medium, the computer program code executable on the processor to relay user data transmitted by the mobile station toward a communication apparatus;
- computer program code stored in the storage medium, the computer program code executable on the processor to determine, after establishment of a wireless connection between the mobile station and the wireless network, whether the user data received from the mobile station already includes a first portion of the identification data; and
- computer program code stored in the storage medium, the computer program code executable on the processor to add a second portion of the identification data to the user data relayed from the mobile station toward the communication apparatus in response to determination that the user data, received from the mobile station after establishment of the wireless connection, fails to include the first portion of the identification data of the mobile station.

25. The communication system of claim 24, wherein the user data is relayed over a communication route that comprises a transmission control protocol connection.

26. The communication system of claim 24, wherein the identification data of the mobile station comprises a telephone number and the mobile station data further comprises an internet protocol address assigned to the mobile station.

27. The communication system of claim 24, wherein the mobile station data further comprises a geographic location of the mobile station.

28. The communication system of claim 24, further comprising:
- computer program code stored in the storage medium, the computer program code executable on the processor to add to the user data only that portion of the identification data that has not already been added to the user data relayed from the mobile station toward the communication apparatus.

29. The communication system of claim 24, further comprising:
- computer program code stored in the storage medium, the computer program code executable on the processor to direct the addition of the second portion of the identification data to the user data as a function of a request received from the mobile station.

30. The communication system of claim 24, further comprising:
- computer program code stored in the storage medium, the computer program code executable on the processor to direct the addition of the second portion of the identification data as a function of what is required to be transmitted over a wired network to a server; and
- computer program code stored in the storage medium, the computer program code executable on the processor to forward the user data with the second portion of the identification data toward the communication apparatus.

31. The communication system of claim 24, wherein the user data received from the mobile station includes the first portion of the identification data, further comprising:
- computer program code stored in the storage medium, the computer program code executable on the processor to replace the first portion of the identification data included in the user data transmitted by the mobile station, after establishment of the wireless connection, with the second portion of the identification data included in the stored mobile station data.

32. The communication system of claim 24, further comprising:
- computer program code stored in the storage medium, the computer program code executable on the processor to stop, after establishment of the wireless connection, further transmission of user data in response to determination that the user data received from the mobile station, after establishment of the wireless connection, already includes the first portion of the identification data of the mobile station.

33. The communication system of claim 24, wherein the user data includes some portion of the identification data, the communication system further comprising:
- computer program code stored in the storage medium, the computer program code executable on the processor to terminate connection of the mobile station to the wireless network, after establishment of the wireless connection, if the some portion of the identification data included in the user data is unrecognizable.

34. The communication system of claim 24, further comprising:
- computer program code stored in the storage medium, the computer program code executable on the processor to terminate the wireless connection to the mobile terminal in response to determination that the user data, received from the mobile station after establishment of the wireless connection, already includes the first portion of the identification data.

35. The communication system of claim 24, wherein the first portion of the identification data and the second portion of the identification data are different.

36. A method of maintaining an identity of a mobile station in communications transmitted from the mobile station over a wireless network, the method comprising:
- providing a wireless connection between the mobile station and the wireless network as a function of identification data provided by the mobile station;
- storing the identification data received from the mobile station during establishment of the wireless connection in association with a unique address assigned to the mobile station during establishment of the wireless connection;
- determining whether user data, received in a transmission from the mobile station after establishment of the wireless connection, already includes a first portion of the stored identification data; and
- adding a second portion of the stored identification data to the user data transmitted by the mobile station over the wireless network after establishment of the wireless connection based upon determination that the user data, received from the mobile station after establishment of the wireless connection, fails to already include the first portion of the stored identification data, wherein the transmission of the user data comprises the same unique address that is stored in association with the stored identification data.

37. The method of claim 36, wherein adding the second portion of the stored identification data comprises the initial act of receiving the user data over the wireless network from the mobile station.

38. The method of claim 37, wherein adding the second portion of the stored identification data comprises a subsequent act of relaying the user data that includes the second portion of the stored identification data over a wired communication network toward an intended destination.

39. The method of claim 36, wherein storing the identification data comprises requesting the identification data and the unique address from a switching center and directing the storage of the identification data in association with the unique address in a database.

40. The method of claim 36, wherein adding the second portion of the stored identification data to the user data comprises the initial act of matching the unique address of the mobile station included in the user data with the stored unique address assigned to the mobile station during establishment of the wireless connection.

41. The method of claim 36, wherein storing the identification data received from the mobile station comprises storing a telephone number of the mobile station.

42. The method of claim 36, wherein storing the identification data of the mobile station comprises storing data representative of a geographic location of the mobile station.

43. The method of claim 36, further comprising:
in response to determination that the user data already includes the first portion of the stored identification data, stopping further transmission of the user data transmitted from the mobile station that already includes the first portion of the stored identification data.

44. The method of claim 36, further comprising terminating the wireless connection of the mobile station if the user data transmitted from the mobile station includes at least some portion of the identification data that is unrecognized.

45. The method of claim 36, wherein adding the second portion of the stored identification data to the user data transmitted by the mobile station comprises replacing any identification data added by the mobile station with the stored identification data included in mobile station data.

46. The method of claim 36, wherein adding the second portion of the stored identification data comprises determining that portion of the stored identification data that needs to be added as a function of the user data.

47. The method of claim 36, further comprising:
terminating the wireless connection between the mobile station and the wireless network in response to determination that the user data, received after establishment of the wireless connection to the mobile station, already includes the first portion of the stored identification data.

48. The communication system of claim 36, wherein the first portion of the stored identification data and the second portion of the stored identification data are different.

49. A method of maintaining an identity of a mobile device in communications transmitted from the mobile device over a communication network, the method comprising:
a gateway receiving identification data from a mobile station, wherein the identification data is provided by the mobile station during establishment of a wireless connection;
the gateway associating the identification data with a unique address assigned to the mobile station during establishment of the wireless connection;
the gateway storing the identification data in association with the unique address assigned to the mobile station;
the gateway receiving a data message from the mobile station after establishment of the wireless connection, wherein the data message comprises a payload portion;
the gateway retrieving the stored identification data in response to receipt of the data message;
the gateway determining whether the data message received from the mobile station after the establishment of the wireless connection already includes a first portion of the stored identification data provided by the mobile station during establishment of the wireless connection; and
the gateway adding a second portion of the stored identification data to the data message in response to determination that the user data received after establishment of the wireless connection from the mobile station fails to already include the first portion of the stored identification data provided by the mobile station during establishment of the wireless connection.

50. The method of claim 49, wherein the gateway adding the stored identification data to the data message further comprises:
the gateway adding an extension header to the data message, wherein the extension header includes the second portion of the stored identification data; and
the gateway forwarding the data message including the extension header towards a destination.

51. The method of claim 49, wherein the gateway adding the second portion of the stored identification data to the data message further comprises:
the gateway adding an expansion header to the data message, wherein the expansion header includes the second portion of the stored identification information; and
wherein the expansion header is an application expansion header.

52. The method of claim 49, wherein the payload portion comprises application data.

53. The method of claim 52, wherein the gateway adding the stored identification data to the data message further comprises:
the gateway adding an application extension header to the payload portion, wherein the application extension header includes the stored identification data.

54. The method of claim 53, wherein the application extension header is a hypertext transfer protocol extension header.

55. The method of claim 49, wherein the gateway determining whether the data message received from the mobile station, after establishment of the wireless connection, already includes the first portion of the stored identification data comprises:
the gateway determining whether the payload portion of the data message sent from the mobile station includes an expansion header associated with application data;
in response to determination that the application data sent from the mobile station includes the expansion header associated with application data, determining whether the expansion header includes the first portion of the identification data; and
in response to determination that the expansion header includes the first portion of the identification data, generating an indication for the gateway to terminate the wireless connection to the mobile station.

56. The method of claim 49, further comprising:
the gateway terminating the wireless connection to the mobile station in response to determination that the user data, received after establishment of the wireless connection from the mobile station, already includes the first portion of the stored identification data provided by the mobile station during establishment of the wireless connection.

57. The communications system of claim 49, wherein the first portion of the stored identification data and the second portion of the stored identification data are different.

58. An communication network configured to maintain an identity of a mobile station in communications transmitted from the mobile station over a network, the communication network comprising:

a gateway in communication with a mobile network, the gateway configured to receive a message through the mobile network from a mobile station, where the message includes a data portion and is directed to a device in communication with the gateway;

the gateway further configured to determine whether the data portion of the message, received from the mobile station, includes a mobile station identifier provided by the mobile station during establishment of a wireless connection to the mobile network;

the gateway is further configured to, in response to determination that the data portion of the message received from the mobile station already includes the mobile station identifier, delete the message without relaying the message;

the gateway is further configured to, in response to determination that the data portion fails to include the mobile station identifier, add the mobile station identifier to the data portion of the message; and the gateway is further configured to relay the message with the added mobile station identifier towards the device.

* * * * *

UNITED STATES PATENT AND TRADEMARK OFFICE
CERTIFICATE OF CORRECTION

PATENT NO.        : 7,590,741 B2                                              Page 1 of 1
APPLICATION NO.   : 10/483980
DATED             : September 15, 2009
INVENTOR(S)       : Hiromitsu Sumino and Hideharu Suzuki It is certified that error appears in the above-identified patent and that said Letters Patent is hereby corrected as shown below:

In column 13, line 25, please delete "databases" and insert in lieu thereof -- database --.

Signed and Sealed this

Twenty-fourth Day of November, 2009

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,590,741 B2 |
| APPLICATION NO. | : 10/483980 |
| DATED | : September 15, 2009 |
| INVENTOR(S) | : Sumino et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1371 days.

Signed and Sealed this

Twenty-first Day of September, 2010

David J. Kappos
*Director of the United States Patent and Trademark Office*